United States Patent [19]
De Lima

[11] Patent Number: 6,030,534
[45] Date of Patent: Feb. 29, 2000

[54] THREE DIMENSIONAL CONTINUOUS LOOP REACTOR

[76] Inventor: Daniel De Lima, 11334 Hacks Meck Rd., Hacks Meck, Va. 23358

[21] Appl. No.: 09/328,587

[22] Filed: Jun. 10, 1999

[51] Int. Cl.⁷ .................................................. C02F 3/30
[52] U.S. Cl. ..................... 210/629; 210/630; 210/197; 210/208; 210/256
[58] Field of Search ..................................... 210/605, 629, 210/630, 631, 197, 207, 208, 198, 218–220, 256, 258, 261, 262

[56] References Cited

U.S. PATENT DOCUMENTS

| | | | |
|---|---|---|---|
| 3,837,493 | 9/1974 | Lin ............................................ | 210/256 |
| 4,347,135 | 8/1982 | Lafosse et al. ........................... | 210/208 |
| 4,350,588 | 9/1982 | Tsubota .................................... | 210/197 |
| 4,954,257 | 9/1990 | Vogelpohl et al. ....................... | 210/629 |
| 5,447,629 | 9/1995 | Chaumont et al. ....................... | 210/197 |
| 5,565,098 | 10/1996 | Vellinga ................................... | 210/197 |
| 5,785,854 | 7/1998 | McKinney ............................... | 210/197 |

*Primary Examiner*—Thomas G. Wyse
*Attorney, Agent, or Firm*—Frederick F. Tsung

[57] ABSTRACT

A continuous loop reactor system has flow channels in the form of 3-dimensional spirals, defined by a pair of nested vortical walls and vanes which extend from the innermost of the vortical walls towards the outermost wall without contact. The vanes in combination with the vortical walls define a false bottom ditch for treating waste water, particularly for oxidative denitrification. Air exposure is limited to the beginning portion of the spiral flow pattern where the process is still in its aerobic stage. Denitrification is completed in an anoxic stage as waste water progresses further along the pattern. Aeration and motivation are provided by a lift tube/aerator assembly. By employing a false bottom, frictional surface area is decreased and sediment accumulation is eliminated between two vertically adjacent flow paths to provide energy efficient water treatment at low minimum flow rates.

12 Claims, 6 Drawing Sheets

THREE DIMENSIONAL CONTINUOUS LOOP REACTOR

BACKGROUND OF THE INVENTION

1. Field of the Invention

The present invention relates to improved continuous loop reactors. More specifically, the invention relates to reactors defining a spiral three-dimensional flow pattern such that the flow pattern affords time for separations and/or completion of reactions.

2. Description of the Prior Art

Continuous Loop Reactors have been predominantly used in sewage treatment. These require a loop, usually a long channel joined end to beginning so as to provide continuous cycle flow. These traditionally use a directional flow at a minimum velocity of about two feet per second to prevent separation by sedimentation of components of the fluid; sludge and water. Reagents are added at particular sites and reactions occur in time along particular zones of the flow channel as the reagents react.

Processes for treating and denitrifying fermented waste water are well known. In a fermentation process, proteins are converted predominantly to ammonia and organic acids, and carbohydrates are predominantly converted to organic acids. Fermentation can be considered a preconditioning step to further treatment. In a popular process using an oxidative ditch, a particular type of continuous loop reactor, fermented waste is treated and denitrified simultaneously. In this continuous loop reactor, oxygen may be added to fluid fermented waste at a particular site. The fluid, fermented waste water and microbe rich suspension, is aerobic when it contains dissolved oxygen ($O_2$) from the air. Microbes use the oxygen to procreate and to convert some of the ammonia to nitrite and then nitrate. In the course of procreation and metabolism, they consume some organic acids.

Dissolved $O_2$ is consumed as the flow continues along the loop in an environment rich in oxygen consuming microbes, organic acids, and ammonia. Some point along the loop, the dissolved $O_2$ is totally consumed. At this point, and for some further distance downstream along the loop, there are nitrates from bio-oxidation of the ammonia dissolved in the fluid. Since the microbes in the fluid still have a demand for oxygen, they then use the nitrate as a source of oxygen, converting the nitrates to nitrogen gas ($N_2$), most of which is liberated. In a condition wherein available oxygen is in a form other than $O_2$, for example nitrate, the fluid is considered to anoxic.

The microbes are sustained on nitrate until air containing O2 is again added to the fluid. The flow cycle and addition of reagents continue as the organic acids and ammonia are incorporated in the sludge as an increased population of microbes, or as the organic acids and ammonia are converted to $H_2O$, $Co_2$, and $N_2$. Phosphorous and minerals are components of the sludge. Thus, by treating fermented waste water in a reactor that enables the separation of the aerobic zone and anoxic zone, the components that contaminate waste water are removed as sludge and harmless chemicals $H_2O$, $CO_2$, and $N_2$.

Fermented waste water is usually added at a point just before the flow becomes anoxic. At this point, the fresh addition of organic acids from the fermented sewage stimulates the microbes' metabolism to consume nitrate.

Predominantly in the existing art, treated waste water is normally withdrawn from the continuous loop reactor just after aeration. At this phase, phosphorous present is mostly attached to the sludge, and the sludge tends to settle easily. Withdrawn aerated water may be sent to a clarifier. The microbes settle to the reactor's bottom as sludge. Some percentage of the sludge may be withdrawn and returned to the continuous loop reactor. The returned sludge maintains a high microbe density. This high density enables a more intense treatment per unit volume of reactor when compared to reactors without such a return. The remainder of the sludge is withdrawn and disposed of in any appropriate manner.

Clarified water from which sludge is removed is reduced in contaminants. Among contaminants reduced are proteins and carbohydrates which may exist in various stages of decomposition prior to fermentation.

In processes like the above, three containments are typically used:

(A) A fermentation tank to precondition sewage;

(B) A continuous loop reactor to treat and dinitrify fermented sewage which allows separated and sequenced reactions to take place without sedimentation of sludge in the loop of flow; and (C) A clarifier to clarify treated waste water, recover some useful sludge for return to the continuous loop reactor, and to concentrate sludge for disposal.

Traditionally, oxidative ditches for denitrification and purification are configured as a loop. The loop may be in the form of circle, a narrow ellipse, or a folded narrow ellipse. The flow in these conventional oxidative ditches is lateral, as the loop is defined substantially in a horizontal plane. In oxidative ditches, the loop must be long enough such that the time provided by the flow over its length is sufficient for both aerobic and anoxic stages to proceed. In an oxidative ditch loop, induced minimum flow velocity must be such that all wetted surfaces are prevented from accumulating sediment. Sediments will produce foul smelling gases as undesirable anaerobic pockets results. These anaerobic pockets of decaying settled sludge also decrease the denitrification efficiency by wastefully producing methane gas from organic acids. An excess of organic acids usually drives the denitrification step to near completion. Usually a minimum flow velocity is required substantially along the entire loop, typically of about 2 feet per second. Typically, the minimum time for a flow sequence (aeration to aerobic to anoxic) to be effective is about eight minutes. Accordingly, loops of about 480 feet, as described in U.S. Pat. No. 4,146,478 are common. This lengthy flow path makes traditional continuous loop reactors used in denitrification very extensive devices regardless of the volume of sewage being treated.

Further, since most loops include bends, folds, and sharp turns, auxiliary flow motivation and/or vanes are usually required to maintain this minimum flow velocity over all horizontal wetted surfaces to prevent sedimentation. The prior art includes several patents directed to maintaining and/or controlling flow velocities. For example, U.S. Pat. No. 4,278,547 issued Jul. 14, 1981 and U.S. Pat. No. 4,902,302 issued Feb. 20, 1990, both to Reid describe combinations of dual baffle aerators and barriered pump/directional mix jet aerators to conserve momentum of flow in an oxidative ditch. U.S. Pat. No. 4,460,471, issued Jul. 17, 1984 describes flow-control turbines in a barrier type oxidative ditch. U.S. Pat. No. 5,118,415 issued Jun. 2, 1992 to Weis et al. describes an oxidative ditch velocity control system that includes turning baffle members in the end sections of the flow channel. U.S. Pat. No. 4,869,818 issued Sep. 26, 1989 to DiGregorio et al. describes radial flow impellers to enhance propulsion of mixed liquor along the bottom of an oxidative ditch, thereby allowing deeper ditches to be used.

While effective in treating waste waters, several disadvantages exist in oxidative ditch loops. Among these, the loop length required for an oxidative ditch to be effective requires relatively flat land of sufficient area to allow both aerobic and anoxic stages to proceed. Materials for lining walls and floors of long loops (including concrete and/or rubber) can become cost prohibitive. Additionally, the high air to water surface area in a standard oxidative ditch is an undesirable source of oxygen in the anoxic stage of the process. Further, energy demands to provide aeration and flow motivation reduces the overall efficiency of standard oxidative ditch systems.

In addressing the land area problem, U.S. Pat. No. 4,146,478 describes a substantially horizontal, closed spiral path waste water treating system in which concentric loops are rigidly defined by walls. Though this structure does save land area by compact horizontal design, a lengthy flow path is still defined by specifically constructed walls, and the same minimum flow velocity typically used to prevent sedimentation still applies. Similarly, U.S. Pat. No. 4,975,197 describes an orbital type apparatus having concentric channels in which waste water may flow from one channel into an adjacent channel. Though land area use is reduced in these types of oxidative ditches, construction material used in defining plural small channels is proportionally higher when taking into account reduced channel flow capacities. Further, efficiency is reduced as greater friction at walls is encounter per unit volume of waste water treated.

To reduce air to water surface contact during the anoxic stage, U.S. Pat. No. 5,234,595 issued Aug. 10, 1993 to DiGregorio et al. describes an oxidative orbital treatment system that includes an aerobic zone and an anoxic zone, arranged one on top of the other. The zones are separated by an imperforate baffle provided under a surface aerator. U.S. Pat. No. 4,455,232 issued Jun. 19, 1984 to Reid describes eddy jet diffusers for aerating induced flow with improved oxygen transfer efficiencies. U.S. Pat. No. 5,582,734 describes automated determination of nitrogen depletion and improved total nitrogen removal using a control system to increase efficiency.

None of the above inventions and patents, taken either singly or in combination, is seen to describe the instant invention as claimed.

SUMMARY OF THE INVENTION

The present invention provides a method and apparatus for producing 3-dimensional flow within containment in which specific paths of the flow is not rigidly defined. This is accomplished with a modified loop in the form of a conical spiral or vortice in which flow proceeds in circular flow paths of decreasing radius and increasing depth until reaching a lower most point. Back flow and counter spiral flow paths are prevented by vanes. From this lower most point, processed fluid is lifted upwardly through the axis of the conical spiral. Fluid may then be discharged as effluent, clarified, and/or recycled and radially directed for another cycle through the conical spiral flow modified loop. In this reactor, a clarifier may form part of the reactor structure, here and below referred to as mode A, or may form part of a system in which sequential batch processes are performed, here and below mode B. Advantageously, the present structure can function as a clarifier when the fluids therein are no longer flow motivated. An aeration mechanism may be used as a convenient device to both dissolve oxygen in the fluid and propel fluid in a direction along the loop to provide flow. A pumping device and/or a distributing device to motivate flow and rotation may be incorporated in a fluid lift device provided along the axis, or center of a conical containment.

The present apparatus includes a containment structure having an inverted inner conical or vortical wall nested within an inverted outer conical or vortical wall; a vertical lift tube provided in a center axis of the inner vortical wall and extending to be proximate a lower most point within the outer vortical wall, which may extend downward beyond the containment; a fluid motivating device for moving fluid from the lift tube and delivering the fluid to a top of the containment structure with tangential flow to provide rotation of the fluid; and vanes which extend from both the inner vortical wall and the lift tube towards but not in contact with the outer vortical wall. A space defined between the vanes and the outer vortical walls provide a false bottom such that sedimentation from a bottom of a theoretical path above is delivered to a theoretical top of a subsequent path below.

Gas-liquid contact, other than that which may be purposefully introduced (such as when a gas dissolving device is used), is limited to a beginning portion of the spiral flow pattern where the process is still fresh from a gas dissolving phase. By employing a false bottom, frictional surface area is decreased and sediment accumulation is eliminated between two vertically adjacent flow paths. This improves efficiency since less energy is required to motivate a given flow velocity against decreased friction. Further, minimum flow velocity itself may be decreased since sedimentation is less of a problem. A cover or lid may be provided to advantageously isolate any odor or off gases within the containment.

Spiral or vortical flow devices have been used in hydrocyclone type separators, such as described in U.S. Pat. No. 5,466,372 issued Nov. 14, 1995 to Jerabek et al.; U.S. Pat. No. 5,566,835 issued Oct. 22, 1996 to Grimes; U.S. Pat. No. 5,698,014 issued to Cadle et al.; and U.S. Pat. No. 5,510,019 issued Apr. 23, 1996 to Yabumoto et al. These hydrocylcones do not have vanes that prevent vertical rotational flow and thus separation. The present apparatus is not a separator but a three-dimensional continuous loop reactor which may be used for processing fermented waste water in the manner of oxidative ditches. However, a separator may be further included as a clarifier; and may be advantageously provided in the dead space within the inner conical or vortical wall. A cone shaped clarifier is described in U.S. Pat. No. 5,549,818 issued Aug. 27, 1996 to McGrew, Jr.

Accordingly, it is one object of the invention to provide highly efficient, space-saving continuous loop reactors and methods, principally for separation of reactions within a containment by time and space.

It is another object of the invention to provide reactors which may be easily reduced in scale to provide water treatment without having to specifically construct a very long flow path so as to separate reactions with sufficient time for reasonable completion.

It is a further object of the invention to provide reactors which produce a 3-dimensional flow in which friction and sedimentation is minimalized through though the use of false pathway bottoms, sloping sides, and flow velocity.

These and other objects of the present invention will become readily apparent upon further review of the following specification and drawings.

BRIEF DESCRIPTION OF THE DRAWINGS

Other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 2:
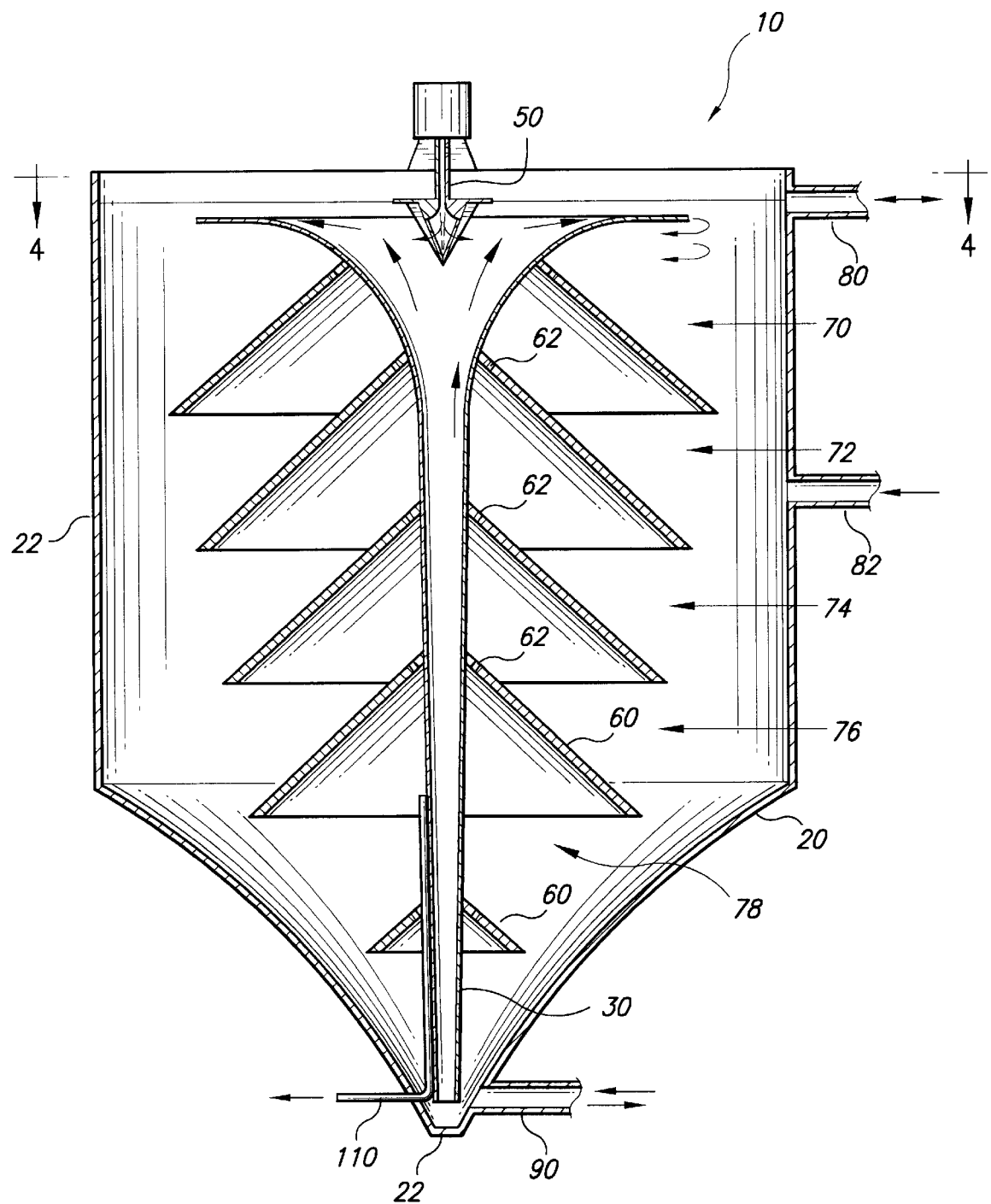
FIG. 2 is a cutaway side view of a continuous loop reactor according to a second embodiment of the present invention including a clarifier.
Figure 4:
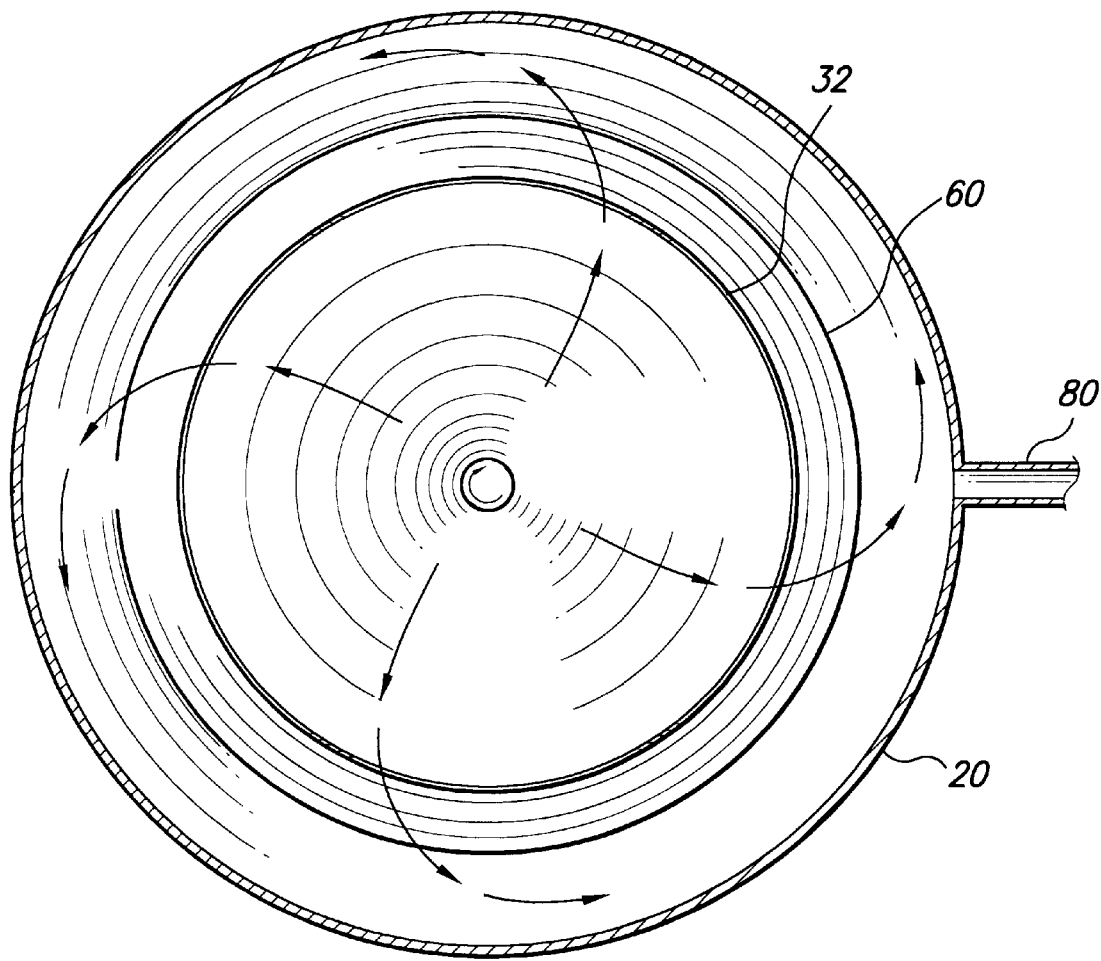
FIG. 4 is a top view of the embodiment of FIG. 2.
Figure 5:
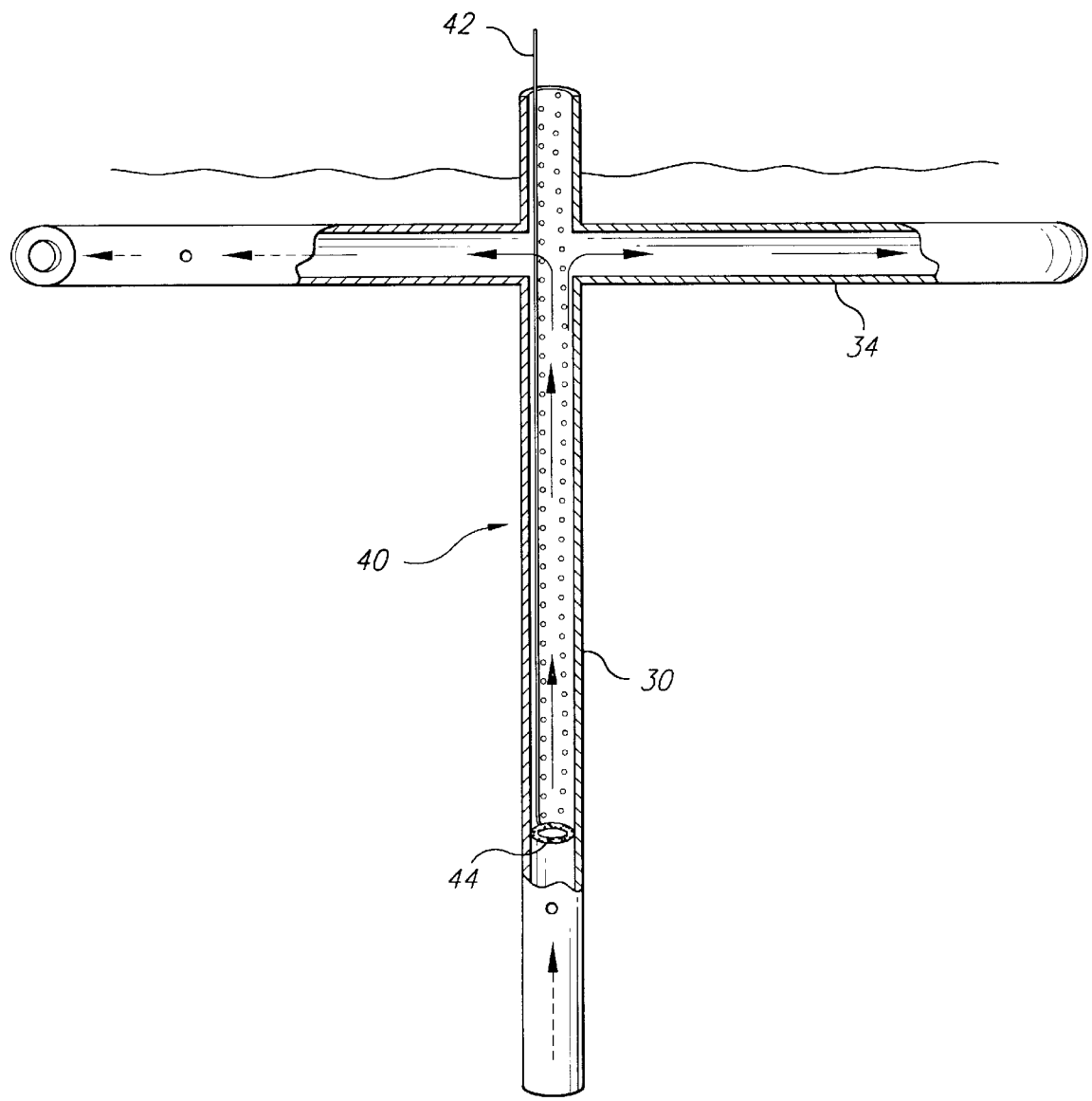
FIG. 5 is a perspective detail view of an aerator/rotor assembly used in the embodiment of FIG. 1.
Figure 6:
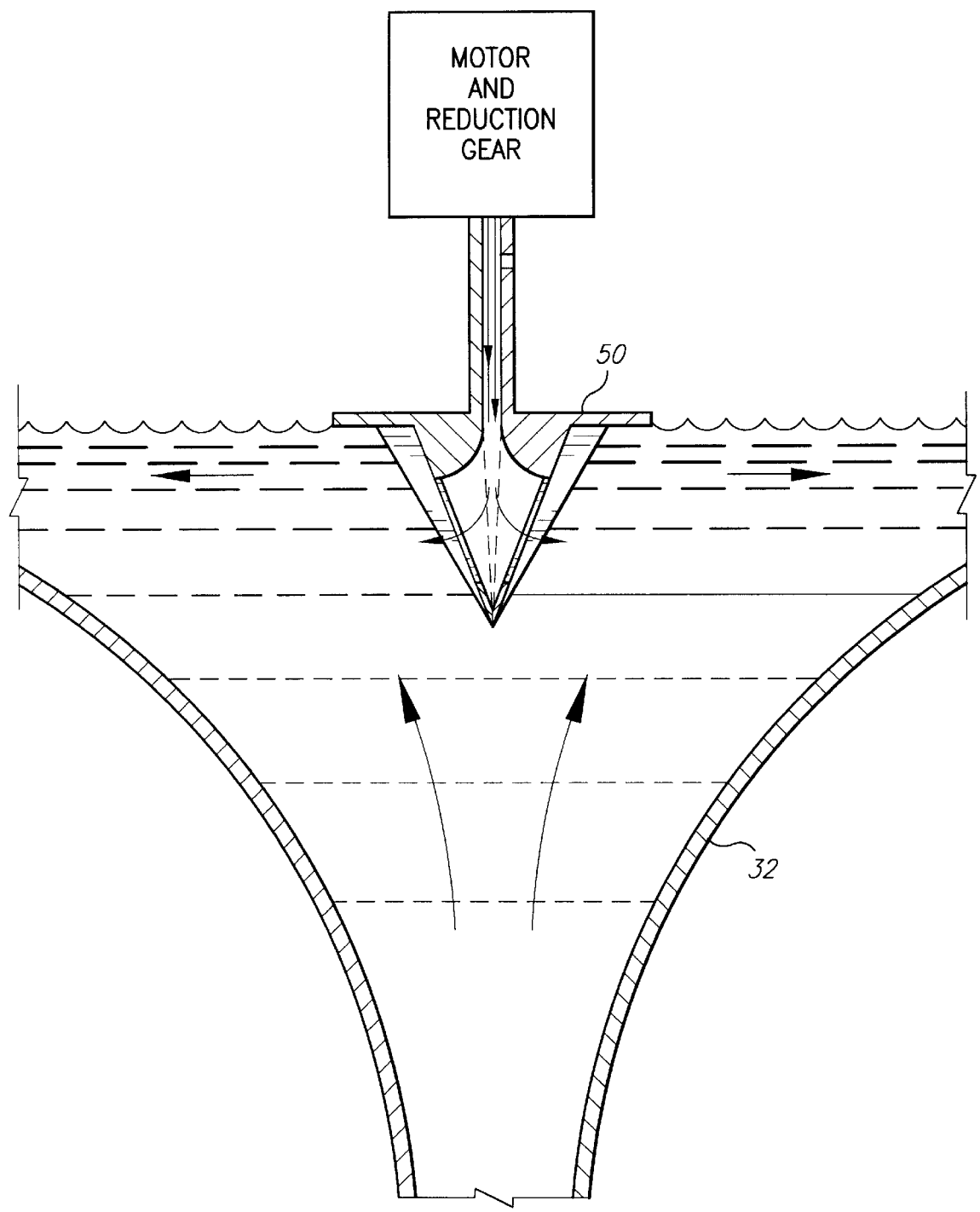
FIG. 6 is a perspective detail view of an aerator/rotor and clarifier assembly used in the embodiment of FIG. 2.

Turning now to FIGS. 4 and 2 of the drawings, a continuous loop reactor 10 according to the present invention includes an outer containment wall with sloping walls such as outer vortical wall 20. The slope of vortical wall 20 is preferably of increasing slope towards apex 22 as shown to best resist sludge and sediment buildup. Centered within outer vortical wall 20 is an axial lift tube/aerator assembly that includes lift tube 30 which extends vertically from proximate apex 22, and flares to define an inner vortical wall 32. Within lift tube 30 an aerator 40 is provided. Though other forms of lift/aerators such as a rotor/aerator, deep U tube/aerator, jet/aerators, venturi/aerators and propeller/aerators may be used, a representative assembly including a compressed air line 42 and a porous air stone ring 44 is shown. A rotor 50 (as best shown in FIG. 6) imparts rotational and radial velocity components to waste water flow such that water is pushed outward until meeting outer vortical wall 20. At the outer vortical wall, the radial component is terminated, and the rotational component causes the fluid to rotate horizontally, beginning a spiraling flow that slowly spirals around and downward.

Vanes 60 are attached to both vortical wall 32 and lift tube 30. Though shown as a series of radially extending skirts, various configurations for the vanes may be used, such as a single vane. Preferably, a plurality of vent holes 62 are provided in the vanes to allow gas generated to escape therethrough. As can be seen, outer vortical wall 20, inner vortical wall 32 or lift tube 30, and vanes 60 define a plurality of flow path channels 70, 72, 74, 76, and 78, each accessible to an adjacent channel via a gap or false bottom. If such flow channels were arrayed within a horizontal plane in a conventional manner, the surface area required would be many times that required by reactors of the present invention.

In operation, rotor 50 and aerator 40 (or compressed air aerator) are activated, fermented waste water is delivered through inlet 80 which is aerated and motivated into the 3-dimensional flow path for both aerobic and anoxic stages of denitrification and BOD placation. Treated water is removed from outlet 82. Excess sludge is collected from proximate apex 22 and removed through conduit 90. If desired a plurality of such reactors may be coupled in parallel and/or serial sequence. For example a system of 3 reactors may be advantageously used for a more complete treatment of waste water as follows: one of the reactors is filled with waste water and used as a fermentation zone, with both the aerator and rotor deactivated; another of the reactors is used for the aerobic and anoxic denitrification process above with aerator and rotor activated; and the last used for clarification in which aerobic sludge is allowed to settle, with rotor deactivated.

Figure 1:
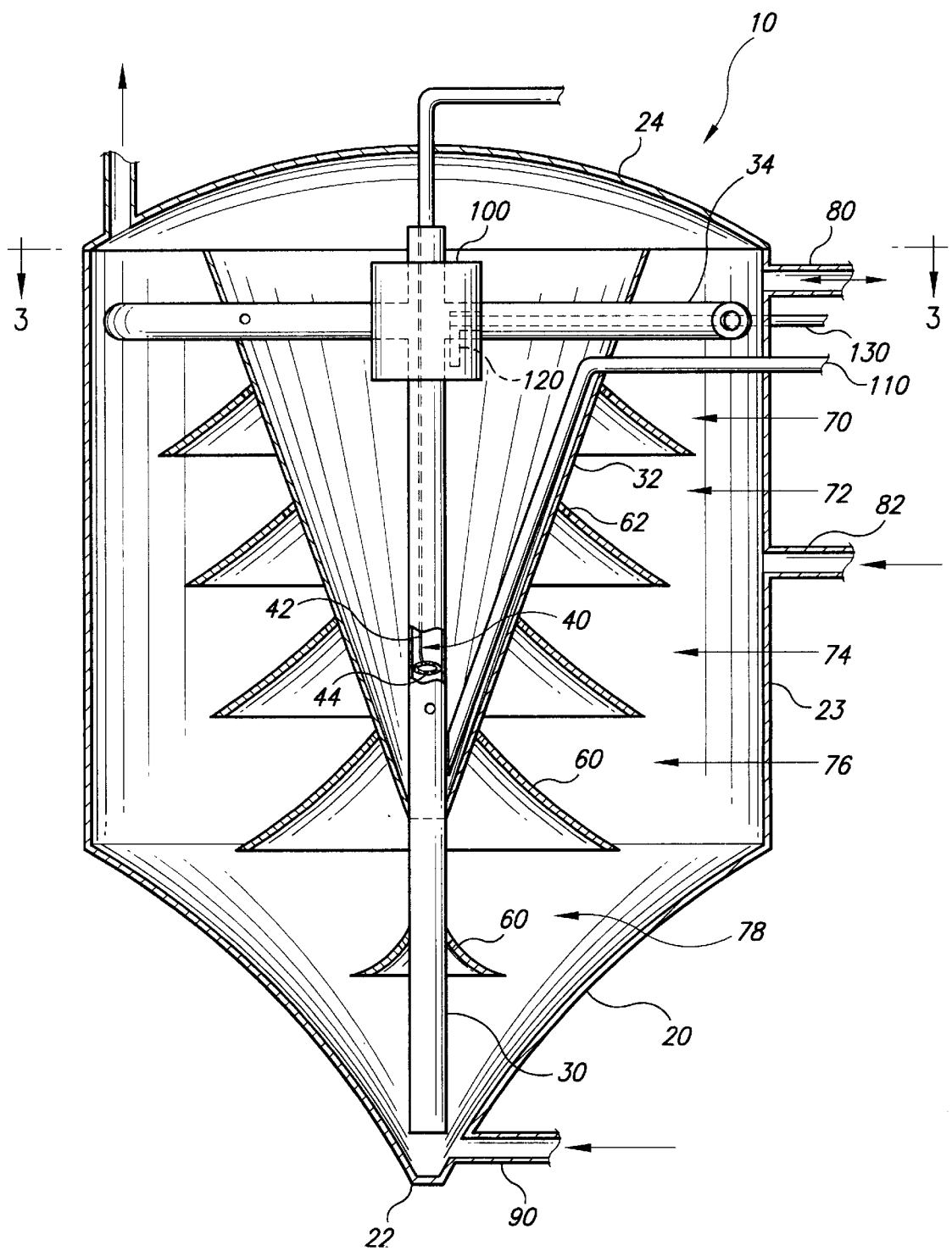
FIG. 1 is a cutaway side view of a continuous loop reactor according to one embodiment of the present invention.
Figure 3:
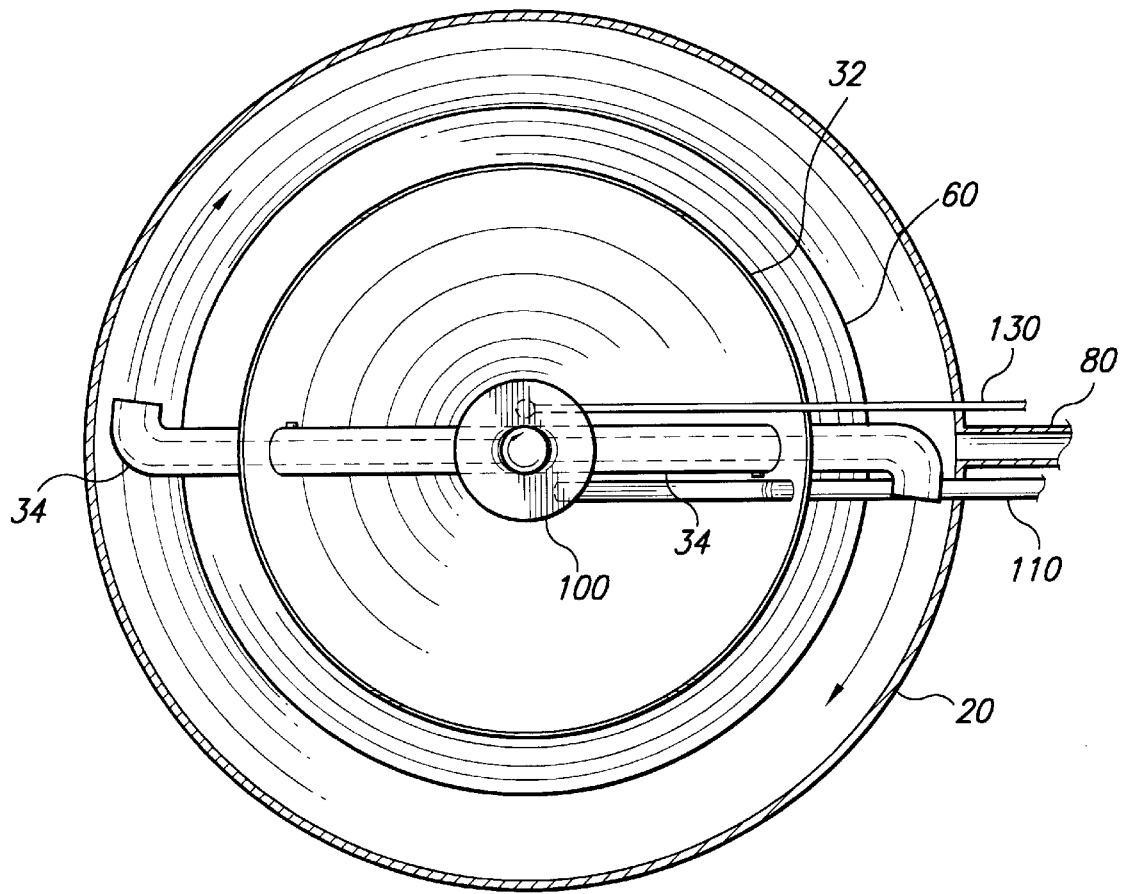
FIG. 3 is a top view of the embodiment of FIG. 1.

As best seen in FIG. 1, a second embodiment of the present invention is described which allows for continuous processing of fermented waste water or for performing other fluid reactions. Here lift tube 30 extends within inner vortical wall 32 to a clarifier assembly 100. A pair of radially extending conduits 34 are attached to lift tube 30, each with a 90 elbow at an end distal the lift tube as best shown in FIG. 3. Clarifier assembly 100 includes an excess sludge out line 110, clarifier inlet 120, and clarified water out line 130. In operation this embodiment allows for both denitrification treatment and clarification of waste waters.

For either the embodiment of FIG. 1 or that of FIG. 2, auxiliary walls 23, and a lid structure 24 may be added to provide more complete containment of process gasses as well as offering a degree of control over process environment.

The vanes 60 may be of constant slope, as shown in the embodiment of FIG. 2. This is particularly advantageous in sequential batch type systems in which flow is induced in one or more steps and not in others. In continuous processing where flow is always induced, the slope of vanes 60 is preferably not constant, but increases towards the central axis of the reactor. This helps to prevent sedimentation on the vanes as flow velocity decreases towards the center.

Besides waste water treatment, such as an oxidative process described above, the present reactors may be used in any fluid reaction in which a long flow path is desired for providing sufficient time to substantially complete the fluid reaction. For example, another useful process for which the present reactors are useful is the production of ethanol from molasses. In such, a supply of sterile molasses and pure bottom yeast may be reacted to consistently produce ethanol. A high concentrate yeast population can be maintained without settling by induced flow in either continuous loop reactor embodiment of the present invention. This may be 50 times that normally used in conventional batch fermentation processes. Molasses, of for example 25 percent concentration in water is introduced to the reactor, and the highly concentrated yeast converts the molasses to ethanol (18 percent ethanol for the 25 percent molasses example) in the absence of oxygen. Minimal residual sugars are produced at the end of the loop. At the end of the loop, the zone just prior to where the molasses was added, the fermented broth containing minimal residual sugars is withdrawn and the alcohol removed from the broth. Thus, sugars are minimally removed prior to their conversion to alcohol, improving the efficiency of the process by not removing sugars, and not producing a waste rich in sugars that would have to be additionally treated before discharge into the environment.

It is to be understood that the present invention is not limited to the embodiments described above, but encompasses any and all embodiments within the scope of the following claims.

I claim:

1. A continuous loop reactor for fluid reactions comprising:
    an inverted outer vortical wall;
    an inverted inner vortical wall nested within and having the same axis as said outer vortical wall;
    a lift tube extending through said inner vortical wall to proximate an apex of said outer vortical wall;
    at least one vane attached to one of said lift tube and said inner vortical wall to form concentric vertically and horizontally displaced flow channels along with said outer vortical wall and one of said inner vortical wall and said lift tube;

a fluid motivating device for motivating fluid through said lift tube from; and an aeration device.

2. The continuous loop reactor according to claim 1, comprising a plurality of vanes, at least one of said vanes attached to said lift tube, and at least another one of said vanes attached to said inner vortical wall.

3. The continuous loop reactor according to claim 1, wherein a plurality of gas vents are provided in each of said vanes.

4. The continuous loop reactor according to claim 1, further comprising a clarifier, said clarifier attached in fluid communication with said lift tube.

5. The continuous loop reactor according to claim 4, further comprising a pair of radially extending conduits attached to an end of said lift tube distal said apex.

6. The continuous loop reactor according to claim 1, further comprising an auxiliary wall extending vertically from said vortical outer wall.

7. The continuous loop reactor according to claim 6, further comprising a lid for substantially covering said reactor, said lid attached to said auxiliary wall.

8. The continuous loop reactor of claim 1 wherein said fluid motivating device is selected from the group consisting of a jet, a jet aerator, a gas lift, a rotor, and a propeller.

9. The continuous loop reactor of claim 8 wherein said fluid motivating device further includes the addition of facilities to mix and dissolve gasses or gas, liquids, and solids or combinations of gases liquids and solids.

10. A system for the treatment of waste water comprising a plurality of the continuous loop reactors of claim 1, each of said plurality of said continuous loop reactors in fluid communication with at least another of said plurality of said continuous loop reactors.

11. The system of claim 7, comprising three of said continuous loop reactors, one of said continuous loop reactors deployed for fermenting waste water, another of said continuous loop reactors deployed for denitrification of waste water, and a third of said continuous loop reactors deployed for clarification of waste water.

12. A method for the treatment of waste waters comprising the steps of:

a) fermenting said waste waters;

b) placing fermented waste waters from a) into a continuous loop reactor of claim 1;

c) aerating said fermented waste water;

d) motivating said fermented waste water into a 3-dimensional flow within the flow channels of said reactor;

e) aerobically processing waste water from d);

f) anoxically processing effluent produced by e); and g) removing a second effluent produced by f).

* * * * *